United States Patent [19]

Phelps et al.

[11] 4,087,593

[45] May 2, 1978

[54] DRIVE SHAFT ASSEMBLY AND METHOD

[75] Inventors: Orville F. Phelps; Innis J. MacRitchie, both of Sylvania, Ohio

[73] Assignee: Dana Corporation, Toledo, Ohio

[21] Appl. No.: 768,655

[22] Filed: Feb. 14, 1977

Related U.S. Application Data

[63] Continuation-in-part of Ser. No. 670,734, Mar. 26, 1976, abandoned.

[51] Int. Cl.² .................... B23P 15/04; C21D 9/50
[52] U.S. Cl. .................... 428/683; 29/156.8 P; 148/127; 29/156.8 B
[58] Field of Search ........ 64/15; 29/156.8 B, 156.8 P; 148/37, 127; 428/682, 683, 684, 685

[56] References Cited

U.S. PATENT DOCUMENTS

| 3,470,037 | 9/1969 | Suzuki | 148/127 |
|---|---|---|---|
| 3,661,658 | 5/1972 | Oda et al. | 148/127 |
| 4,001,054 | 1/1977 | Makepeace | 148/127 |

Primary Examiner—Arthur J. Steiner
Attorney, Agent, or Firm—Robert E. Pollock; Robert Leonardi; Richard D. Emch

[57] ABSTRACT

An improved drive shaft assembly of uniform high strength, and a method for producing the assembly. The method includes welding a tubular shaft of an alloy steel to an end fitting such as the yoke of a universal joint or a coupling. The welded assembly is then heat treated by bringing the assembly to the austenite phase, uniform throughout the assembly, quenching the assembly in a vertical position, and thereafter tempering the assembly at a temperature uniform throughout to the desired hardness. In this manner, the non-uniform structures in the heat affected weld zone are made homogeneous, thereby producing favorable distribution of strength characteristics and residual stresses throughout the entire assembly.

10 Claims, 3 Drawing Figures

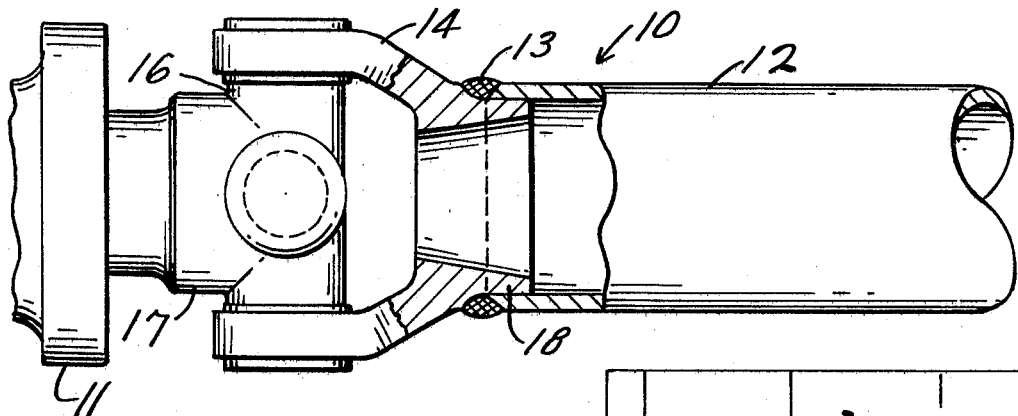
FIG-1-
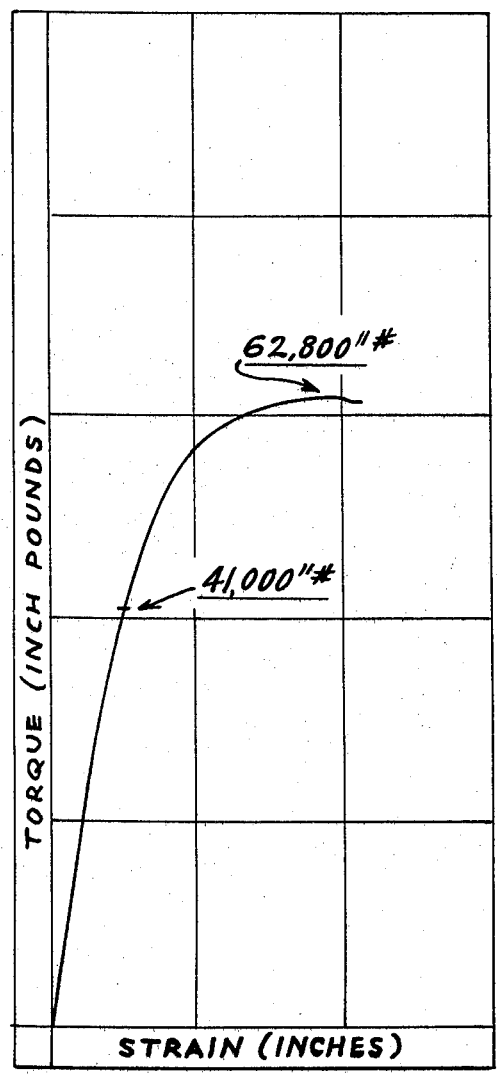
FIG-2-
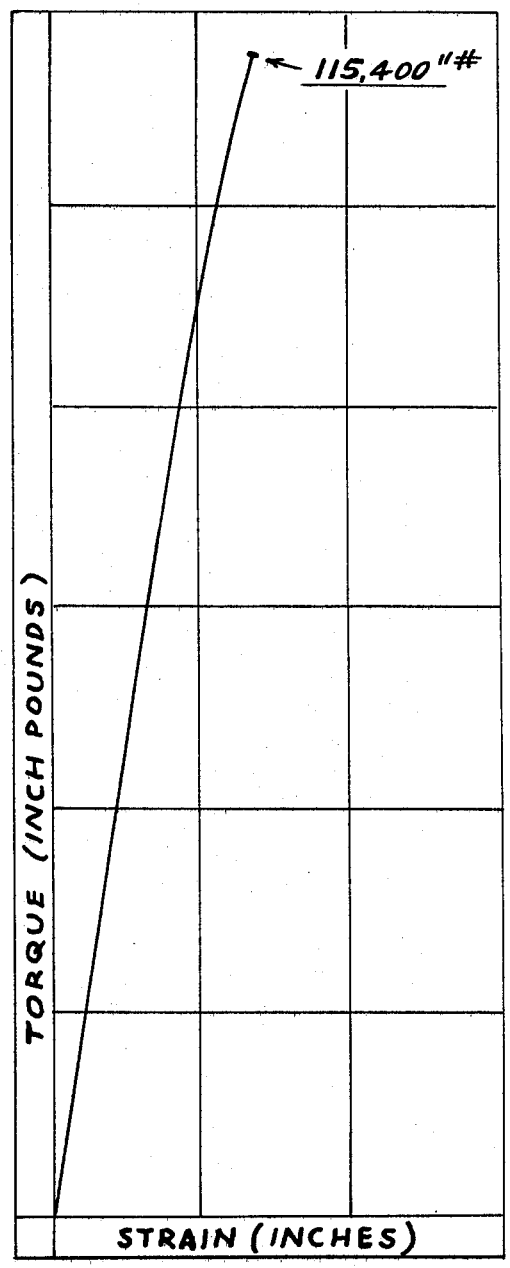
FIG-3-

DRIVE SHAFT ASSEMBLY AND METHOD

CROSS-REFERENCE TO RELATED APPLICATIONS

This is a continuation-in-part application of Ser. No. 670,734, filed Mar. 26, 1976, now abandoned.

FIELD OF THE INVENTION

The invention relates to vehicle drive shaft assemblies and more particularly to a high strength drive shaft assembly and a method of producing the assembly.

BACKGROUND OF THE INVENTION

It has been common practice in the manufacture of drive shaft assemblies, also known as propeller shafts, to produce the assembly by welding a length of cold-rolled, non-alloyed low carbon steel tubing to an end fitting such as the yoke of a universal joint or a coupling. The welding of the end fitting to the tubing, however, results in a heat affected zone due to high temperatures in the vicinity of the weld. These high temperatures produce regions of varying strengths and hardness in the heat affected zone. The base metal in the weld area is subjected to all temperatures from above the melting point down to room temperature. The metallurgical changes in this heat affected zone are many and are determined by the temperatures reached and the subsequent cooling rates.

The microstructure of the weld nugget is columnar. The material is molten during the time current flows, and during solidification the grains first form at the solid boundary. The grains can only grow in one direction resulting in the typical columnar grain structure in this region. Another distinct zone immediately adjacent the solid boundary also reaches a high temperature but not enough to melt the material. At this elevated temperature considerable grain coarsening develops.

Proceeding away from the weld toward the unchanged base metal in another zone that had been heated above the upper critical temperature but not hot enough to give coarsening. In that zone the grain is refined, or in other words, annealed. The hardness is greatly reduced because of the annealing treatment and the tensile strength is lowered to about 65,000 psi. From that zone outward there is a gradual change in metallurgical phase and tensile strength back to the original unchanged base metal.

Because of the substantial weakness in the heat affected zones of drive shafts manufactured in this way, it has been common design practice to simply provide a very large section of cold-rolled steel tubing, heavy enough to withstand the torsional forces to be expected in service, even in the weakened, weld-annealed areas. The shafts are thus designed for their weakest points, the heat affected annealed areas, and are considerably heavier and stronger than necessary throughout the remainder of their lengths. Such shafts are substantially heavier in weight, thicker in gauge, and sometimes larger in diameter than drive shafts produced according to the present invention described below.

A related problem in drive shafts has been torsional vibration. This problem generally increases with an increase in shaft diameter. Therefore, when the diameter of the shaft is reduced, according to the present invention, the torsional vibration problem is generally reduced.

Other problems known in the art are inherent system unbalances associated with attachment runout and large polar-moments of inertia, which increase inertial excitation accompanying shaft non-uniform rotation.

Heat treating of certain structures subsequent to welding operations is known. One of the purposes of the heat treatment is to relieve heat induced stresses resulting from the welding operation. However, the known art does not disclose the manufacture of a drive shaft assembly from a hardenable alloy steel tube, by first performing the welding operations and then heat treating the assembly within the specific temperature limitations and according to the accompanying steps of the method of the present invention described below.

The drive shaft assembly of the invention is produced by first welding a hardenable steel alloy tube to the yoke of a universal joint or other end fitting. The entire assembly is then heat treated and tempered according to specific procedures which include heating and quenching to form martensite and, subsequently, tempering. The result is a drive shaft assembly of superior physical properties. The tubing section of the shaft is of uniform hardness and uniform residual stress, with no adversely affected zone in the vicinity of the weld. A uniform martensitic steel structure is achieved. Drive shafts produced according to the invention, as compared with conventionally manufactured prior art shafts of the same size and weight of steel tubing, have been found to exhibit a two- to three-fold increase in torsional strength.

A drive shaft assembly according to the present invention is considerably stronger, for a given size tubular shaft, than drive shafts produced according to prior methods of manufacture described above. Thus, a shaft assembly of reduced size and weight can be produced according to the invention, with at least equal torsional strength to that of a prior art conventional shaft assembly.

By reducing the diameter of the drive shafts, according to the present invention, the spring rate is changed and the torsional vibration problem is reduced. A light weight, high strength drive shaft constructed according to the present invention, permits a reduced torsional spring rate which is sometimes required to de-tune a system torsional vibration response.

Such improved drive shafts provide a reduced shaft polar moment of inertia, which in turn reduces inertial excitation accompanying shaft non-uniform rotation, which is a consequence of universal joint non-uniform motion.

Therefore, light weight, high strength drive shafts, according to the present invention, provide multiple advantages. Inherent system unbalance associated with attachment runout is reduced. Not only is the basic weight of the unit lowered while maintaining the structural strength requirements, but the reduction of static weight reduces deflection between supports and therefore reduces vibrational problems. In some applications, a center drive shaft bearing may be eliminated without resulting in undesirable vibration. System lateral response frequency, a function of shaft support characteristics and shaft weight, is increased when using shafts according to the present invention.

FIG. 1 is a partially sectioned fragmentary view of an end of a drive shaft connected to a universal joint manufactured according to the invention;

FIG. 2 is a graphical representation showing the results of a test of a conventionally manufactured drive shaft to determine its torsional yield strength.

FIG. 3 is a graphical representation showing the results of a test of a drive shaft according to the invention to determine its torsional yield strength.

In the drawings, FIG. 1 shows a portion of a drive shaft and universal joint assembly 10 coupled to another driving element 11, such as a transmission or a differential. The assembly 10 includes a length of tubing 12 which serves as the drive shaft itself, and a U-shaped universal joint yoke 14, the two components being connected by an exterior weld 13. The universal joint of which the yoke 14 is a part includes a journal cross 16 which is rotatably mounted in the yoke 14 and in a second yoke 17 which is shown connected to the driving element 11. The opposite end of the shaft 12 (not shown) may be connected to another universal joint yoke or to another type of end fitting such as a coupling, spline connection, or the like.

As shown in FIG. 1, the preferred construction of the assembly 10 is with a collar 18 on the yoke 14 inserted into the end of the tubular shaft 12. The weld 13 is formed at the circumferential exterior intersection of the two components. However, any suitable interfitting of the two components, with the appropriate weld, may be employed.

The tubular shaft 12 is of a medium carbon, low alloy or medium alloy steel. For cost reasons, the carbon content is preferably from 0.25 – 0.45 percent. The alloy content must not be too high in order to prevent "cracking" problems upon quenching, and to also keep the cost of the steel relatively low. For those reasons conventional low or medium alloy steels are preferred. Generally, such steels would contain a maximum of 1.5 percent chromium, a maximum of 0.3 percent molybdenum, and none of the alloying elements from the group consisting of cobalt, tungsten, nickel or copper. A typical exemplary steel is S.A.E. 4130 steel alloy. However, any steel having good strength, toughness and cost characteristics may be used, that will form martensite when hardened. A typical yoke is of medium carbon steel with sufficient alloying elements to harden when quenched. As discussed below, the tubular shaft 12 is welded to the universal joint yoke 14 prior to the heat treating and tempering of the shaft and yoke assembly 10.

As discussed above, in conventional drive-shaft and end fitting assemblies, the tubular shaft 12 is generally of a low carbon, cold-rolled, non-alloyed steel. A typical example of the steel used would be a 1020 steel, with a hardness of about 85 $R_B$ and a tensile strength of about 80,000 psi or other materials of like characteristics. For a given torsional strength, the thickness and/or the diameter of such a tubular shaft would be considerably greater than that of the assembly 10 according to the invention. This is because, as discussed above, areas of the tubular shaft in the vicinity of the weld connection to the end fitting are weakened by an annealing effect which occurs in that area during the welding operation. The tubular shaft in such conventional construction must be larger in order that the weakened areas be strong enough to withstand torsional stresses encountered in service.

According to the method of the invention, the tubular member 12 is first welded to the universal joint yoke 14, preferably as shown in FIG. 1. The shaft and yoke assembly is then heat treated by bringing the assembly to a temperature of from 1475° to 1800° F., for a sufficient time to assure that all areas of the assembly have reached uniform temperature. More specifically, a temperature range of between 1525° F. to 1575° F. may be utilized and a temperature of about 1550° F. is preferred, because this is a typical austenitizing temperature for the preferred type of steel. Heating of the assembly is preferably done in a neutral atmosphere, such as a nitrogen or exothermic atmosphere, to minimize oxidation. Depending, of course, upon the type and intensity of heating means employed to bring the assembly to heat treating temperature, the approximate time required to assure that all areas have reached uniform heat treating temperature is about one hour per inch thickness of the thickest section in the assembly.

The shaft and yoke assembly is next quenched by vertically inserting into an agitated oil quenching bath, or in another quenching medium having similar cooling characteristics (transmitting heat more slowly than water). The vertical position insures even, symmetrical immersion of the tubular shaft into the bath, with respect to the shaft's cross section. Such even, symmetrical immersion provides for a minimum of distortion due to thermal stresses that could otherwise result from uneven cooling during quenching. The cooling rate of the assembly in the quenching bath is sufficient to obtain a uniform martensite granular structure in the steel.

The heat treated assembly is brought substantially to atmospheric temperature during quenching. Subsequently, the assembly is tempered with a secondary heating to relieve the stresses induced by the quenching step. Tempering is accomplished by bringing the assembly to within a temperature range of about 800° F. to 1200° F. until the desired temperature is reached uniformly throughout the assembly. Preferably, the assembly is heated to about 1050° F. for the exemplary S.A.E. 4130 drive shaft. The tempering step enhances ductility and toughness in the steel assembly, as well as relieving residual stresses. The resulting steel structure is a tempered martensite structure of about 35 $R_C$ hardness with a tensile strength of about 160,000 psi FIGS. 2 and 3 show the results of torsional strength testing of a drive shaft produced according to conventional practice as described above and of a drive shaft according to the invention, respectively. The two tubular shafts were of the same diameter, thickness and length, and similar yokes were used. Each graph is a plot of torsional loading in inch-pounds (vertical axis) versus strain in inches (horizontal axis). As indicated in FIG. 2, the conventional shaft formed from 1020 carbon steel began to yield at about 41,000 inch-pounds. The yielding of the tubular shaft was in the form of bending and twisting in a plastic type deformation. The shaft thus could not recover its original shape and strength beyond a loading of about 41,000 inch-pounds. The uppermost point on the graph is at about 62,800 inch-pounds, the ultimate strength of the shaft. At this point, the shaft had, of course, undergone considerable deformation.

The graph of FIG. 3 shows the test results for the drive shaft produced according to the invention, employing an S.A.E. 4130 alloyed steel tubing and with the entire welded assembly heat treated and tempered together as described above. In this test, the tubular shaft itself did not fail. Rather, the fixture failed. The journal cross was used to apply the load to the shaft and yoke assembly. The loading reached in the test was 115,400 inch-pounds, without yielding or failure of the drive shaft assembly itself. As seen by a comparison of the graphs of FIGS. 2 and 3, this is two and one-half times or greater the loading reached in the test of the conventional drive shaft before yielding of that shaft commenced. The graphs shown in FIGS. 2 and 3 are representative only and are not intended to show absolute ultimate strengths. The results shown in the graphs plot the results of single tests and only indicate that for a typical situation, the strength of an assembly constructed according to the present invention is greatly improved over that of a typical prior art assembly.

Thus, the drive shaft of the invention, utilizing the same size and thickness of tubing but of a different steel and produced according to the specific steps described above, exhibited a significantly greater working strength than that of the conventional shaft assembly. In actual design practice, a drive shaft assembly, according to the present invention, could include a tubing member approximately one-half to one-third as heavy as the tubing employed to produce a conventional drive shaft. This obviously enables a significant reduction not only in total weight of a vehicle but also in material cost for production of a drive shaft. In addition, the torsional vibration problems are reduced.

The embodiments of the invention in which an exclusive property or privilege is claimed are defined as follows:

1. A method for producing a light weight drive shaft assembly of substantially uniform high strength, comprising: welding an end fitting to the end of a tubular shaft of low or medium alloy steel containing 0.25–0.45 percent carbon; heat treating the welded assembly by heating the assembly in a neutral atmosphere to a temperature in the austenitizing region of from 1475° F. to 1800° F., for a time sufficient to bring all areas of the assembly to substantially uniform temperature; quenching the assembly to form a uniform martensitic grain structure by symmetrical immersion of the assembly into a quenching medium; and tempering the assembly by heating the assembly to a temperature of 800° F. to 1200° F., for a time sufficient to bring all areas of the assembly to substantially uniform temperature.

2. The method of claim 1 wherein the heat treating step comprises heating the welded assembly to a temperature of about 1550° F.

3. The method of claim 1 wherein the tempering step comprises heating the assembly to a temperature of about 1050° F.

4. The method of claim 1 wherein the quenching step comprises immersing the assembly in vertical orientation into the quenching medium.

5. The method of claim 1 wherein the quenching step comprises immersing the assembly, in vertical orientation, into an agitated medium which transmits heat more slowly than water.

6. A drive shaft assembly of substantially uniform high strength produced according to the method of claim 1.

7. A drive shaft assembly of substantially uniform high strength, as set forth in claim 6, wherein said alloy steel contains less than 1.5 percent chromium, less than 0.3 percent molybdenum, and no elements from the group consisting of cobalt, tungsten, nickel, and copper.

8. A drive shaft assembly of substantially uniform strength, as set forth in claim 6, wherein said tubular shaft is of S.A.E. 4130 steel.

9. A method for producing a light weight, high strength drive shaft assembly, comprising: welding an end fitting to the end of the tubular shaft of low or medium alloy steel containing 0.25–0.45 percent carbon; heat treating the welded assembly by heating the assembly in a neutral atmosphere to a temperature in the austenitizing region of from 1525° F. to 1575° F., for a time sufficient to bring all areas of the assembly to substantially uniform temperature, such time being equal to approximately one hour per inch thickness of the thickest section of the assembly; quenching the assembly to form a uniform martensitic grain structure by immersing the assembly in vertical orientation into a quenching medium which transmits heat more slowly than water; and tempering the assembly by heating the assembly to a temperature of 800° F. to 1200° F., for a time sufficient to bring all areas of the assembly to substantially uniform temperature.

10. A vehicular drive shaft assembly produced according to the method of claim 9.

* * * * *